June 7, 1932.   D. G. STEELY   1,862,166
CONTINUOUS CHOCOLATE MAKING PROCESS
Filed June 10, 1927   2 Sheets-Sheet 1
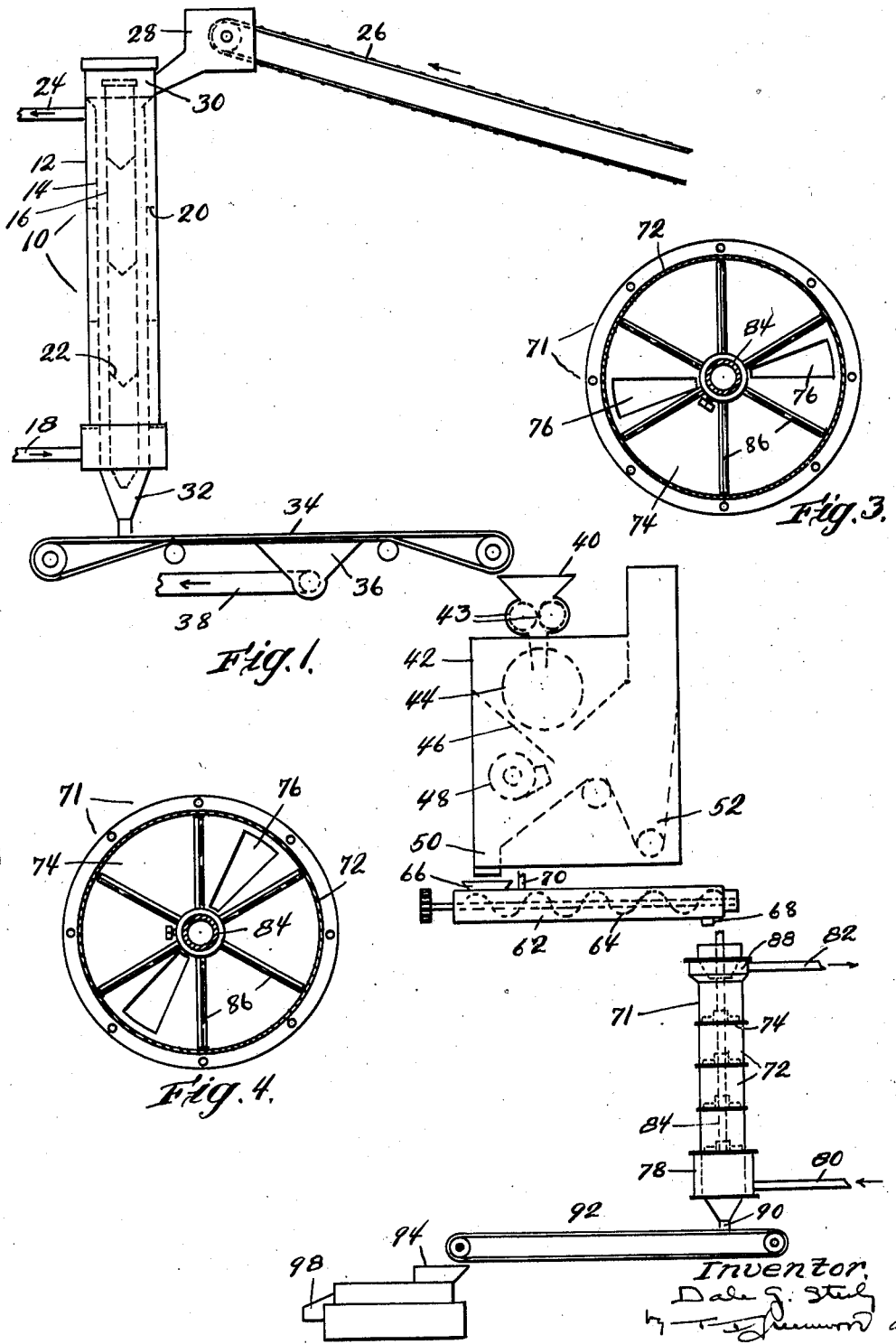

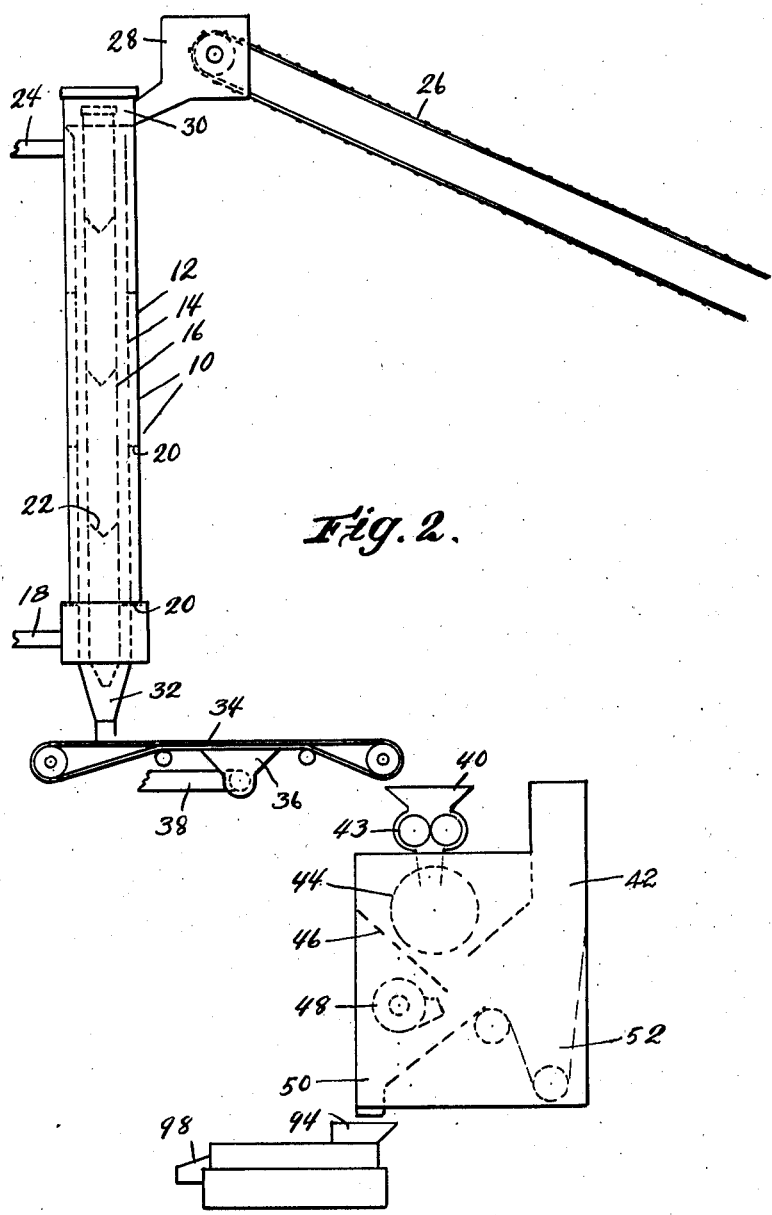

Patented June 7, 1932

1,862,166

UNITED STATES PATENT OFFICE

DALE G. STEELY, OF ARLINGTON, MASSACHUSETTS, ASSIGNOR TO W. F. SCHRAFFT & SONS CORPORATION, OF NORTH BOSTON, MASSACHUSETTS, A CORPORATION OF MASSACHUSETTS

CONTINUOUS CHOCOLATE MAKING PROCESS

Application filed June 10, 1927. Serial No. 197,959.

This invention relates to and has for an object a process and system for the manufacture of chocolate in a continuous manner wherein the various pieces of apparatus of the system are interconnected and are adapted to perform certain operations in successive order upon the cacao beans in a moving stream of beans and in such a manner that a continuous stream of raw beans is introduced into the apparatus at one end of the system and immerges as chocolate liquor at the other end of the system.

The invention has the advantage over the heretofore common procedure of chocolate making in that it economizes time, the intermediate storage space heretofore necessary to receive the partially prepared materials is rendered unnecessary, impairment of the quality and possible contamination of the partly prepared materials while in storage is obviated, and the process may be controlled with a nicety heretofore unrealized so that the resultant product is uniform and is of a superior quality.

A further object is generally to improve upon chocolate making systems and methods.

In the drawings:

Fig. 1 is a diagrammatic representation of a chocolate making system embodying this invention.

Fig. 2 is a modified form of the system wherein certain pieces of apparatus of the system of Fig. 1 are eliminated.

Figs. 3 and 4 are sectional details of the re-roaster of Fig. 1 and illustrating particularly the construction of the perforated tubes thereof.

The apparatus of the continuous chocolate making system embodying this invention includes a continuous roaster for the raw beans, which roaster has a cooler for the hot roasted beans associated with it. The cooled roasted beans are delivered into a cracking and fanning machine wherein the beans are cracked into nibs and the germ and shell is removed from the nibs. A continuously operated impregnator receives a continuous supply of nibs and mixes them in a continuous manner with a liquid alkali. A second roaster or re-roaster roasts the alkali treated nibs and a grinding machine grinds the re-roasted nibs to a liquid mass. The mass from the grinder may be further treated in any usual or suitable manner.

The continuous roaster 10 associated with the system is described and claimed in my co-pending joint application with Frederick W. Blake, Serial No. 197,960, filed concurrently herewith.

The roaster comprises essentially a long vertical stack comprising an outermost imperforate tube 12, an intermediate imperforate tube 14 and an innermost perforate tube 16. Said tubes are approximately concentric and are spaced one from the other. The space between the innermost and intermediate tubes comprises a passage in which a slowly downwardly moving hollow column of raw beans to be roasted is adapted to pass in a continuous manner. Heated gas, as air, from any suitable source is introduced into the bottom of the outermost tube through a pipe 18 and is caused to travel alternately inwardly and outwardly between the outermost and innermost tubes and through the moving bean column in the intermediate tube to the top of the stack by the provision of staggered diaphragms 20 and 22 in the innermost and outermost tubes.

A continuous supply of raw beans is delivered by a suitable conveyor, as a belt, 26 into a bin 28 which is located above the top of the stack from which bin the raw beans pass continuously into the hopper 30 at the top of the stack and thence into the passage between the innermost and intermediate tubes. The roasted beans issue in a continuous manner from the bottom of the stack through a nozzle 32 onto a moving conveyor belt 34 which is disposed immediately beneath the nozzle opening and which supports the column of beans in the stack. As the belt moves forwardly from beneath the nozzle, it withdraws roasted beans in a continuous manner from the stack and the beans are deposited in a continuous layer on the belt. The rate at which the conveyor belt is moved determines the rate at which the roasted beans are withdrawn from the stack. With a fixed temperature and volume of heated gas, the rate at which the conveyor belt is moved determines the character of the roast given the beans. If the belt is moved rapidly, the beans will be given a light roast and conversely if the belt is moved slowly, the beans will be given a high roast. The speed of the conveyor belt is adjusted to satisfy specific requirements of the roast and when once set need not be further adjusted as all beans will be roasted uniformly. The conveyor belt is made of wire screen or is perforate. A hood 36 is disposed immediately beneath the conveyor belt and is connected through a pipe 38 to a suitable exhauster not shown thereby to cause cold air to be drawn continually through the hot roasted beans on the conveyor belt to cool them down to such a temperature that the roasting will not continue due to the stored heat in the beans. The end of the conveyor belt is disposed in position to discharge a continuous stream of beans into the hopper 40 of a continuously-operable cracking and fanning machine 42.

Said cracking machine may be of any suitable type but preferably includes a pair of cracking rolls 43 between the bight of which the beans pass and are cracked. The cracked pieces, or nibs, together with the loose shell, fall in a continuous stream into the entrance of a cylinder 44 having graded perforations therein through which the nibs and shell pass and fall down an inclined plate or shelf 46. Blasts of air from fans 48 are directed across the lower edge of the plate and divert the shell into the hopper 50 and permit the shell-free nibs to fall into the hopper 52.

For the manufacture of certain kinds of chocolate and cocoa, and especially the so-called dutch-process cocoa, the nibs are treated with an alkaline solution, as ammonia, for the purpose, amongst others, of modifying the flavor to suit certain requirements. To this end, my system includes an impregnator 62 which comprises essentially a relatively long tube having a conveyor screw 64 therein which is adapted to convey the nibs in a continuous stream from the inlet hopper 66 thereof to the outlet duct 68. The inlet hopper 66 is disposed below outlets of the cracking and fanning machine in position to receive the continuous stream of nibs issuing therefrom. A pipe 70 is in communication with the interior of the impregnator adjacent the inlet end thereof and a continuous stream of suitable alkaline solution is adapted to be introduced or sprayed into the impregnator and onto the nibs passing therethrough. The impregnator is adapted to be of such length and the nibs are adapted to be so agitated within the impregnator that they will be uniformly acted upon by the alkaline solution. The amount of alkali solution introduced will depend upon the nature of the beans and is adapted to be entirely taken up by the beans so that there is no free or unabsorbed alkali at the discharge end of the impregnator. The outlet duct 68 of the impregnator is disposed in position to discharge a continuous stream of alkalined nibs into the inlet opening of a second roaster, or re-roaster, 71 wherein the nibs are given an additional and finishing or final roast at which time any excess alkali is driven off.

Said roaster may be similar to the first roaster 10 although preferably it comprises a vertical tube composed of a plurality of superimposed sections 72 having interposed diaphragms 74 therebetween provided with openings 76 therethrough, see Figs. 3 and 4 which are preferably staggered or are not in vertical alignment and through which the nibs pass downwardly between the sections. A jacket 78 surrounds the lowermost tube-section, which is perforated and hot gas under suitable pressure is forced therein through the pipe 80 and passes upwardly through the column of nibs in the sections and out through the pipe 82. A slowly-rotatable shaft 84 axially disposed within the sections has arms 86 which revolve over the diaphragms 74 and serve to carry the column of nibs around with them and to feed the nibs through the diaphragm openings. The upper end of the roaster is provided with a hopper 88 into which a continuous stream of nibs pass from the discharge opening 68 of the impregnator and a continuous stream of dried and roasted nibs passes from the bottom discharge opening 90 of the re-roaster onto the conveyor belt 92. The belt conveys the nibs in a continuous stream into the hopper 94 of a grinding machine which may be of any usual or suitable construction as comprising a pair of superimposed grinding stones between which the continuous stream of roasted nibs are passed and are ground to a viscous liquid known as "chocolate liquor" which issues in a continuous stream from the nozzle or trough 98. From the grinding machine, the mass is removed and may undergo any desirable treatment.

When it is not desired to treat the nibs with alkali, the impregnator and the second or nib roaster will be omitted and the continuous stream of roasted and shell-free nibs will pass from the winnowing machine directly into the hopper of the grinding machine as illustrated in Fig. 2. In this case, the beans will be given a complete roast in the roaster 10.

With the continuous process and system herein described all of the beans are roasted to the same degree of uniformity without any especial attention which is in direct contrast with the batch process heretofore common in the art, wherein the roast depends entirely upon the skill and vigilance of the operator and one batch may be entirely different from another. The flavor and aroma of the bean is better developed and preserved by the use of the continuous process since the bean is passed continuously through the apparatus of the system and is ground very shortly after it is roasted so that the bean does not have time to lose its flavor as is the case with the batch method, wherein the roasted beans and the nibs must be stored for substantial periods of time without undergoing processing.

The continuous process also serves to save space and labor since, after the speed of operation of the various pieces of apparatus of the system have been once adjusted relative to each other, the beans and the nibs pass as a continuous stream through the apparatus without necessitating attention on the part of operatives.

I claim:

1. The method of making chocolate in a continuous manner which consists in roasting a continuously moving stream of raw cacao beans, cracking the roasted beans of the moving stream while preserving the movement of the stream and also while preserving the oil in the beans, abstracting the shell from the moving cracked beans, additionally roasting the stream of cracked shell-free beans, and grinding the re-roasted beans to form a continuous fluid stream of chocolate liquor.

2. The method of making chocolate in a continuous manner which consists in roasting a continuously moving stream of raw cacao beans, cracking the roasted beans of the moving stream while preserving the movement of the stream and also while preserving the oil in the beans, abstracting the shell from the moving cracked beans, mixing a continuous stream of alkali with the stream of cracked beans, additionally roasting the stream of alkali-treated beans, and grinding the re-roasted beans to form a continuous fluid stream of chocolate liquor.

In testimony whereof, I have signed my name to this specification.

DALE G. STEELY.